Jan. 31, 1928.　　　　　　　　　　　　　　　1,657,989
F. BAKER
SEWING MACHINE
Filed Jan. 17, 1923　　　6 Sheets-Sheet 1
Fig.1.
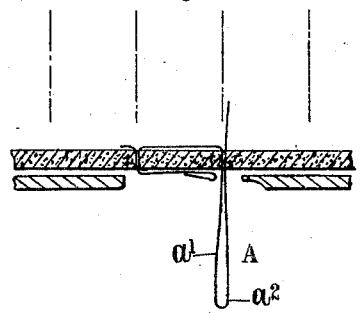
Fig.2.
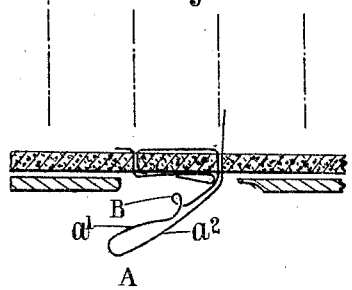
Fig.3.
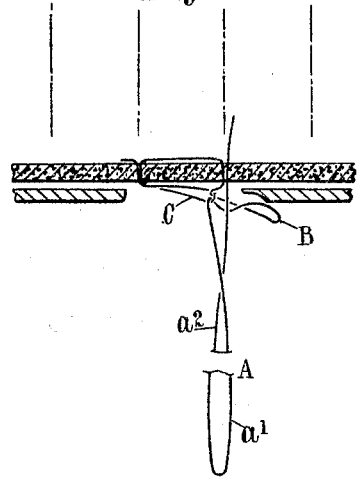
Fig.4.
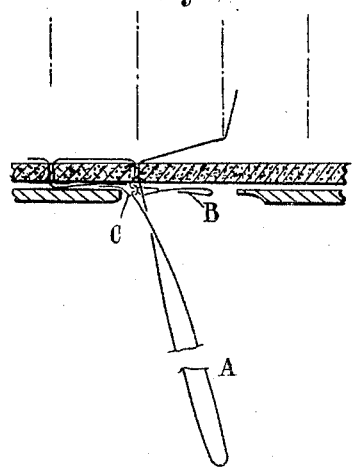
Fig.5.
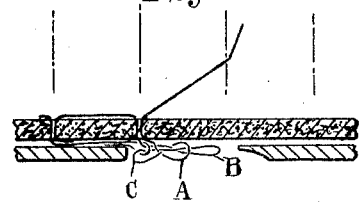
Fig.6.
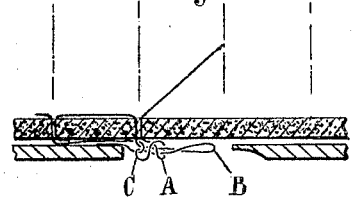
Fig.7.
Fig.7a.
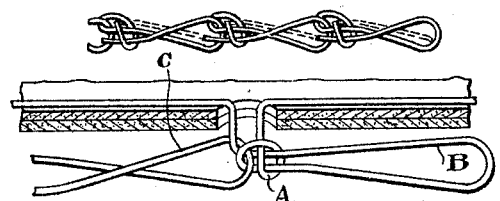
Fig.8.
INVENTOR
F. Baker
by Langner, Parry, Card & Langner
Att'ys.

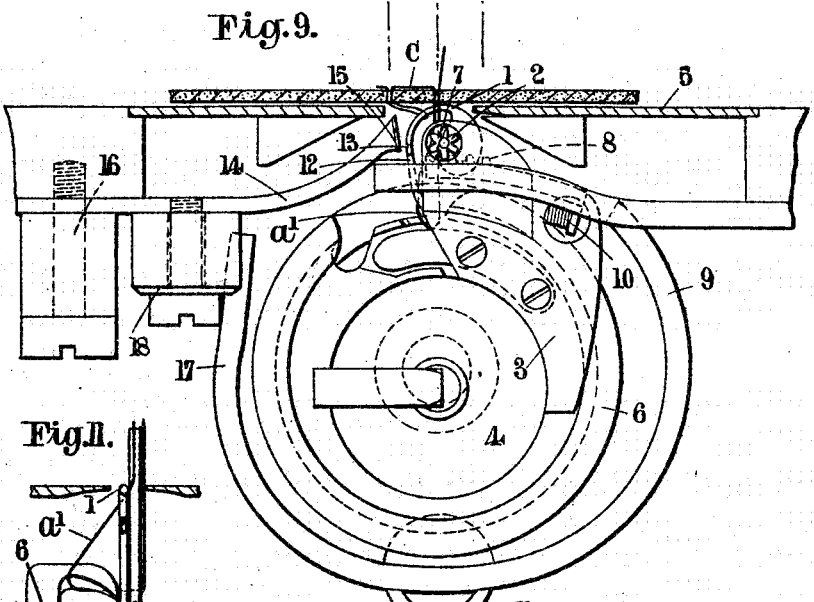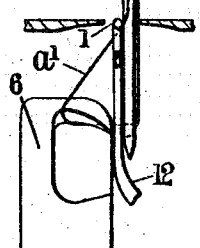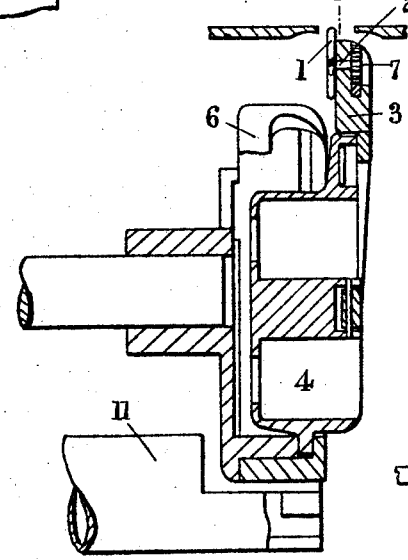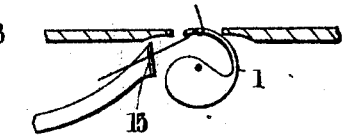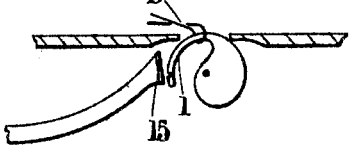

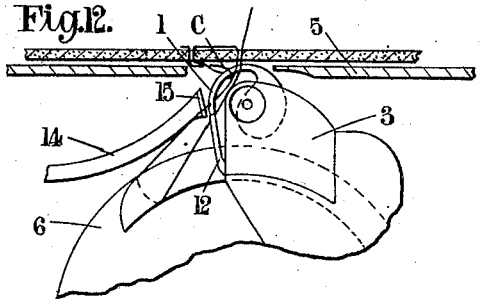
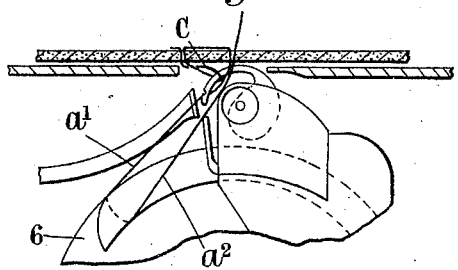
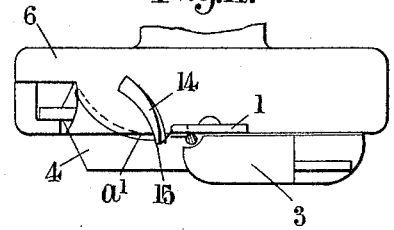
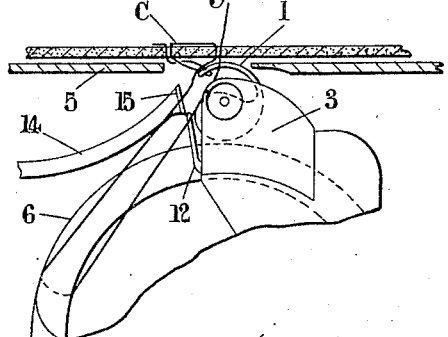

Jan. 31, 1928.

F. BAKER 1,657,989

SEWING MACHINE

Filed Jan. 17, 1923      6 Sheets-Sheet 4

INVENTOR
F. Baker
by Langner, Parry, Card & Langner
Attys.

Jan. 31, 1928.
F. BAKER
1,657,989
SEWING MACHINE
Filed Jan. 17, 1923  6 Sheets-Sheet 5
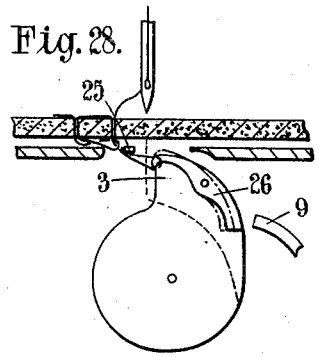
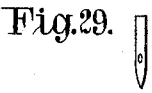
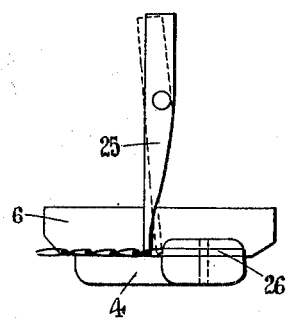
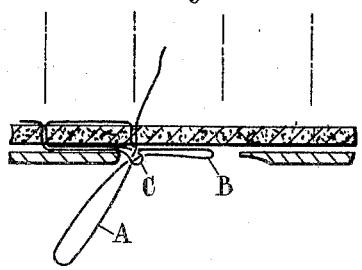
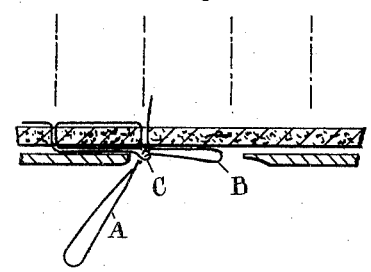
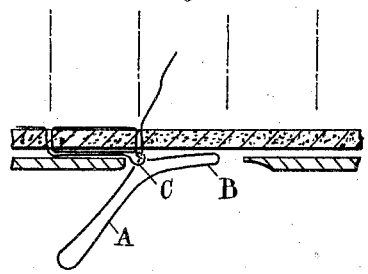
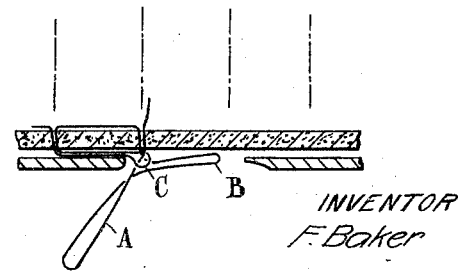

Jan. 31, 1928.

F. BAKER 1,657,989

SEWING MACHINE

Filed Jan. 17, 1923 6 Sheets-Sheet 6

INVENTOR
F. Baker
by Langner, Parry, Card & Langner
Attys.

Patented Jan. 31, 1928.

1,657,989

UNITED STATES PATENT OFFICE.

FREDERICK BAKER, OF BLACKHEATH, LONDON, ENGLAND, ASSIGNOR TO SINGLE THREAD LOCKSTITCH MACHINES LIMITED, OF LONDON, ENGLAND, A COMPANY OF GREAT BRITAIN.

SEWING MACHINE.

Application filed January 17, 1923, Serial No. 613,223, and in Great Britain January 17, 1922.

This invention relates to sewing machines the chief object being to provide simple reliable sewing mechanism of novel construction capable of forming a novel form of single-thread stitching or seam. The method of manipulating the thread and the seam itself are the subject of divisional applications which have matured into issued Patents Nos. 1,559,840 and 1,575,186. The novel construction of mechanism constituting the subject matter of this application may be embodied in existing types of sewing machines whereby they become as a whole novel machines in accordance with my invention or it may be embodied in a specially constructed machine and in either case it may be adapted for either domestic or commercial use.

According to the present invention I provide in a sewing machine means whereby the loop formed from the needle is formed into two loops, a small loop and a large loop, the large loop being twisted and passed (i. e. noosed) over the small loop, and being then drawn tight round it and so tied to it close under or within the work. In the preferred construction hereinafter described this tying of the small loop is thus completed before the needle next pierces the material being sewn. In other words, each completed stitch includes in its formation a locked loop extending from it beneath the material approximately to the next needle penetrating point of the material being sewn. Further features of importance in the preferred construction reside in the fact that a portion of one of the strands of each needle loop is diverted and retained while the remainder of the loop is drawn out twisted and made to encircle the retained portion in such a manner that on the completion of the stitch the said retained portion becomes a locked loop the length of which has been automatically determined by the feed or movement of the material being sewn. This loop is in fact the smaller of the two loops into which each needle loop is formed as above stated.

In the particular mechanism hereinafter described the above mentioned diverted and retained strand of the needle loop involved in the second and all subsequent stitches of a line of sewing is carried through the previous loop and thereby itself becomes a loop extending through the bight of the said previous loop.

The invention also provides means whereby a machine capable of acting as a single thread locked stitch machine in accordance with the present invention is also capable of being converted at will into an ordinary two-thread lock stitch machine.

In order that the invention may be clearly understood and readily carried into effect the same will now be described more fully with reference to the accompanying drawings in which the manipulation of the needle thread and the mechanism for manipulating it are illustrated, it being understood that there are many instances of distortion, enlargement and lack of right proportion in these drawings, particularly in showing the manipulation of the thread, in order to render the same more clear and readily understood.

Figures 1 to 6 illustrate diagrammatically various stages in the manipulation of the thread for producing sewing in accordance with my invention. As hereinbefore stated the method of sewing and the seam itself are the subject of divisional applications.

Figure 7 is an enlarged distorted representation of the resultant seam untightened, as seen on the underside of the material, and Figure 7ª is a perspective view.

Figure 8 represents the seam with the thread tightened.

Figure 9 is an end elevation and

Figure 10 is a corresponding cross sectional elevation of mechanism for manipulating the thread in accordance with Figures 1 to 8.

Figure 11 is a fragmentary view of part of Figure 10 showing how the rotary looper of the machine engages an incipient needle loop.

Figures 12, 13, 14 and 15 show the essential parts of the mechanism shown in Figures 9 and 10 but in progressive positions.

Figures 16 and 17 show the hooked finger hereinafter described and the thread engaged by it.

Figure 20 is similar to Figures 18 and 19 and illustrates how the simple lever mechanism shown in those figures can be shifted to convert a single thread lock stitch machine in accordance with my invention into an ordinary two thread lock stitch machine.

Figure 21:
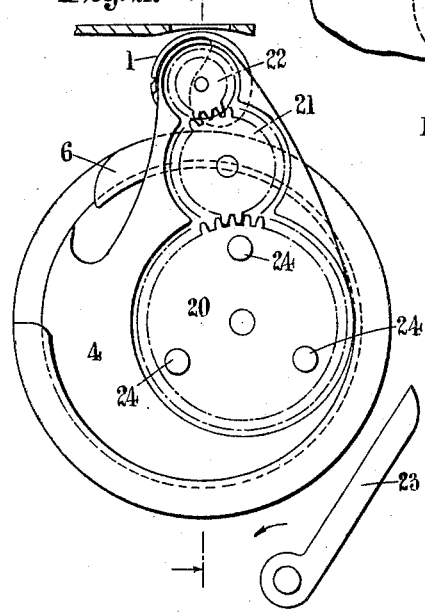
Figure 22:
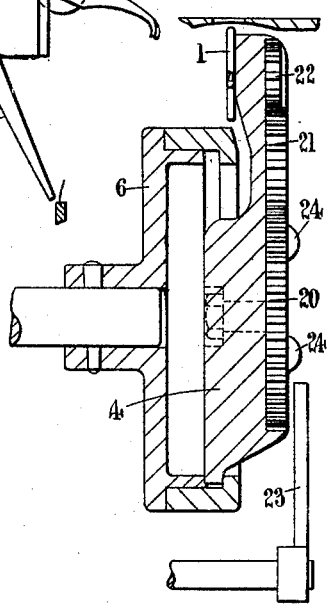
Figure 23:
Figure 24:
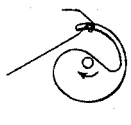
Figure 25:
Figure 26:
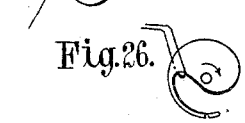
Figure 27:
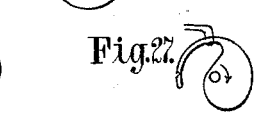

Figures 21 and 22 are a front elevation and vertical cross section respectively of a rotary looper and a casing with gearing to operate a rotary form of the hooked finger.

Figures 23 to 27 illustrate progressive positions of the rotary hooked finger and the thread manipulated by it.

Figure 28 is an end elevation,

Figure 29 a corresponding side elevation and

Figure 30 a corresponding plan of parts of a modified machine, and

Figures 31 to 34 are diagrammatic representations of the manipulation of the thread by the mechanism shown in Figures 28 to 30.

Figure 35:
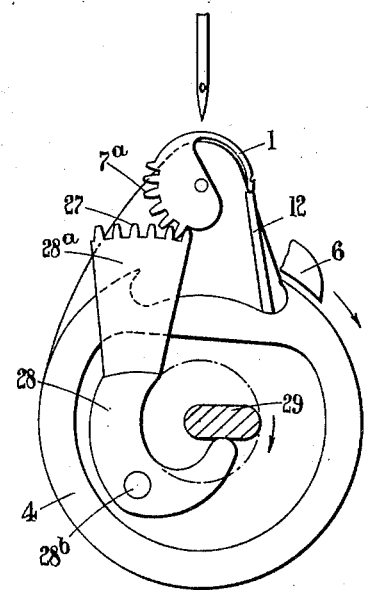
Figure 36:
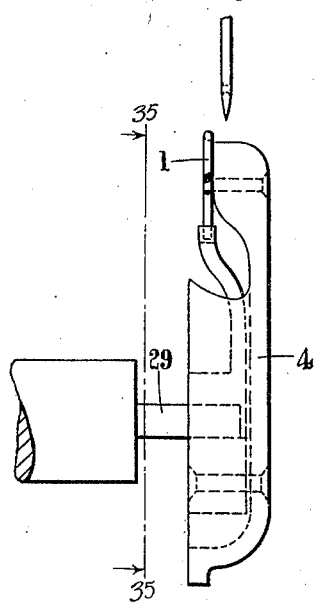
Figure 37:
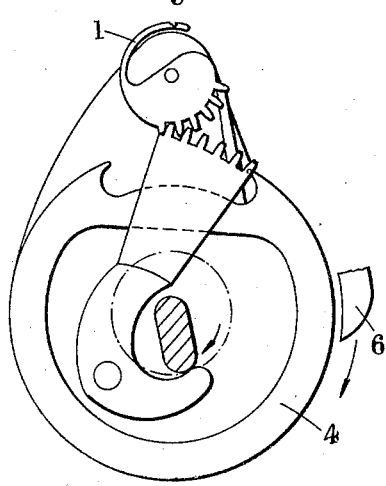
Figure 38:
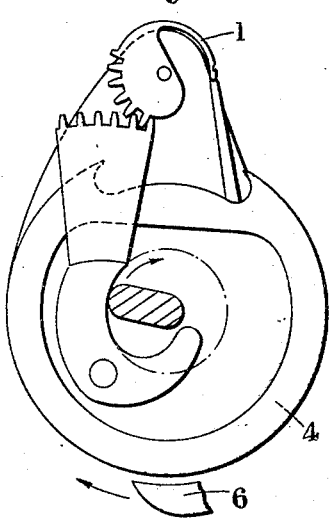

Figures 35 and 36 are respectively a face view and a side elevation section line 35—35 of Fig. 36 of a further modification of mechanism (shewn fragmentarily) for operating the hooked finger, and Figures 37 and 38 are views similar to Figure 35 but illustrating the parts in different positions.

Referring first to the manipulation of the thread apart from the mechanism whereby it is effected, it is seen by reference to Figures 1 to 8 that as a needle thread loop A consisting of the strands $a^1$ and $a^2$ is being drawn out below the needle plate as shown in Figure 1 the strand $a^1$ is formed with a twist or incipient loop B as shown in Figure 2, and as the loop A continues to be drawn out it is twisted so that the position of the back and front strands is reversed as shown in Figure 3 and meanwhile the loop B is drawn back through the bight of a loop C. At this stage the usual feed mechanism of the machine operates and the material and thread shift to the left as shown in Figure 4. As the loop A is drawn up it is passed (i. e. noosed) over the loop B as shown in Figure 5 and the tightening of the thread by the usual take-up mechanism causes the actual bight or bend of the loop A to slip around the strands of the loop B as shown in Figure 6. During the final tightening of the thread the encircled strands of the loop B and the strands of the loop C are twisted or turned over upon themselves thereby producing a strong and firmly locked stitch and a close appearance of the double strands lying close beneath the material between the penetrations somewhat as shown in Figure 8.

I will now refer to one constructional form and arrangement of mechanism whereby the above operations are effected mechanically.

The mechanism which I will now proceed to describe is embodied in a standard type of lock stitch sewing machine possessing most or all of the well known features of modern machines, including the usual rotary needle thread loop drawing device or looper as it may be termed, the spool thread case, take-up mechanism, feed mechanism and the like.

An important element of the mechanism illustrated is the hooked finger 1 which is arcuate in shape and is provided with a small horizontal shaft or pin 2 mounted in a plate 3 attached to the usual spool thread case 4. This finger is situated close under the needle plate 5 and close to the path of the needle and in fact almost vertically above the front edge of the usual rotary looper 6.

The finger 1 is periodically oscillated about the axis of its shaft or pin 2 in any convenient way, the particular means shown comprising a pinion 7 gearing with a rack 8 slidably mounted in the plate 3 and periodically moved by an external arm 9 against the pressure of a spring 10. The arm 9 is mounted on a shaft 11 periodically rocked by any convenient means not shown. Assuming the main shaft rotates twice to each penetration of the needle the shaft 11 is rocked once to each penetration.

The point of the hooked finger 1 normally rests in a "closed" position on the top of a small guide post 12 extending up from the lower part of the plate 3.

The finger 1 is notched as at 13 near its point for a purpose hereinafter explained.

Figure 18:
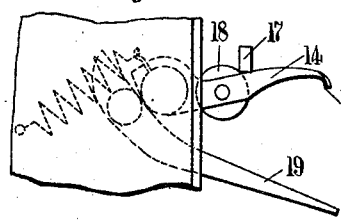
Figures 18 and 19 are plan views showing how a strand deflecting member hereinafter referred to operates.
Figure 19:
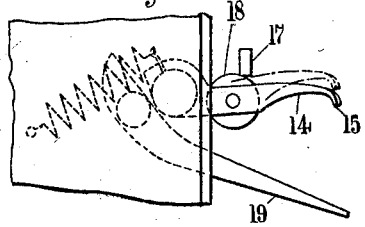

A further element of the mechanism as shown is the strand deflecting member 14 the free end 15 of which is shaped to readily engage the thread and is positioned close to the notch on the hooked finger 1. This strand deflector 14 is mounted to oscillate in a horizontal plane about a vertical pivot 16 on the bed plate of the machine. In its normal position the free end 15 is at the rear of the plane of the hooked finger 1 but periodically the deflector is rocked so that the free end passes from the rear to the front of the plane of the said finger. Any convenient rocking means may be employed, the particular mechanism shown consisting of an arm 17 extending from the rocking shaft 11 already mentioned, and a roller 18 on the deflector for engagement with the free end of the arm 17 so that when the latter rocks in the vertical plane the deflector 14 rocks in the horizontal plane as illustrated in Figures 18 and 19.

The foregoing description of the construction and position of the parts will enable the operation of the same to be now followed. In Figure 9 it is assumed that the machine has already been operated so that the loop C resulting from the formation of a previous stitch is still on the finger 1. In the position of the parts shown the needle has descended and is just beginning to rise and in so doing it forms a bulge or incipient loop to one side of the needle in the well known way. This bulge extends under the hooked finger 1 and is engaged by the point of the looper 6 as shown in Figure 11.

As the looper advances in a counter-clockwise direction and draws out the needle loop in the vertical plane, the deflector 14 advances horizontally and its end 15 thrusts the strand $a^1$ across the edge of the hooked finger thereby causing this strand to become caught in the notch 13 as shown in Figures 13 and 14.

During the movement of the looper, the rocker arm 9 engages the end of the rack 8 and causes the hooked finger to "open" by backward oscillation away from the guide post 12 as shown in Figure 13. The deflector 14 also retreats. The position of the parts and the shaping of the looper and spool case are such that at this stage the strand $a^1$ returns to the rear and the strand $a^2$ crosses to the front of the guide post. It is thus seen that the strand $a^1$ is twisted wrapped or looped upon the hooked finger 1 as shown clearly in Figure 16 and that the large loop A has become a crossed or twisted loop. In drawing Figure 16 the fact that the thread is in practice drawn back through the bight of the previous loop as shown in Figures 15 and 3 has been ignored, the purpose of Figure 16 being merely to indicate how the strand $a^1$ becomes twisted into an incipient loop. In practice as just stated the hooked finger by its backward oscillation draws the twisted or looped portion of the strand $a^1$ through the bight of the loop C as shown in Figure 15 and the bight of the loop C eventually slips or is cast off the point of the finger 1 and embraces the strands of the new loop B as shown clearly in Figures 15 and 3. The finger 1 then moves forward again through the new loop B leaving the bight of this loop to assume its most natural position as shown in Figure 17. The manner in which the hooked finger manipulates the thread causes an automatic twist of the strands of the retained loops around one another.

It is to be noted that when the loop A has been fully drawn out on the looper 6 and the feed mechanism has advanced the material to the required extent ready for the next descent of the needle the new loop B is already drawn out defined and locked before the next penetration of the material by the needle takes place.

As the looper 6 advances still further, the loop A is drawn up around and over the plate 3 and the loop B, and the bight of the said loop A is eventually tightened upon and becomes firmly locked with the strands of the loop B and with the bight of the previous loop C close under or within the material.

Figure 20:
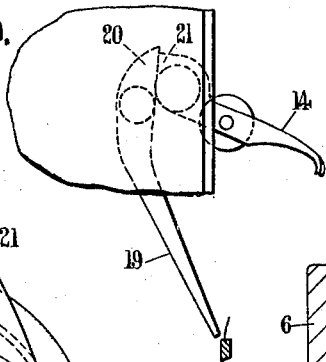

Although the invention has been so far described with reference to one constructional arrangement and disposition of the parts it is not limited to them but may equally well be carried out by various modifications. For instance owing to the fact that the novel form of stitching is produced by a single supply of thread, namely the needle thread, there is no need to have a spool case nor to have a rotary looper large enough to embrace a spool case. In fact the looper employed in carrying out my invention may be quite small. In cases however where I apply my invention to a spool thread lock stitch machine of standard or known type, a further feature of my invention consists in the fact that the machine can be readily converted. If for example the strand deflector above described be rendered inoperative and a spool of thread be inserted into the spool case, ordinary lock stitching is produced. Vice versa, the rendering of the deflector operative enables my novel form of single thread lock stitching to be produced from the same needle thread and without the removal of any existing parts. One simple mechanical contrivance for effecting the above conversion is shown in Figures 18 and 19, and consists in a lever 19 pivoted to the bed plate of the machine and provided with a toe piece 20 situated to co-operate with a similar toe-piece 21 on the deflector 14. By turning the lever 19 shown in Figures 18 and 19 clockwise and securing it in the adjusted position the deflector is turned from the position shown in Figure 18 to the position shown in Figure 20 and maintained inoperative as long as desired.

Although in the foregoing description an oscillating finger has been used in the formation of a small loop from one strand of the needle loop, the said small loop may be formed by other means. I may for instance employ a hooked finger having an intermittent rotary motion and incidentally I may employ the equivalent of the spool thread case as a gear case for the driving mechanism of the finger as shown in Figures 21 and 22. In the construction shown in these figures the pinion 2 on the small shaft or pin of the hooked finger 1 is driven through the gearing 20, 21, 22. The gear wheel 20 mounted in the case 4 is driven intermittently by any suitable means such as by a rocking or rotating arm 23 adapted to engage equally spaced studs 24 on the face of the pinion 20. The extent of movement of the pinion 20 at each actuation is such that for each movement of it the hooked finger is rotated one complete revolution. The manner in which the hooked finger manipulates the thread will be evident from a consideration of Figures 23 to 27 which show successive positions of the finger. The last but one of these figures shows that the bight of the loop has slipped up to the crown of the hook ahead of the notch and the last of the figures shows the hook arrived back at its starting position.

Although as hereinbefore stated my novel form of stitching in all cases involves the formation of a small loop and a large loop from a single needle loop and the passing of the large loop over the small loop and drawing it up thereon, the actual formation and manipulation of these loops may be effected in various ways. For example the needle at each descent may pass between the strands of a retained loop instead of close alongside the same. Also instead of using a single member to retain one loop and assist in the formation of a second similar loop, I may employ two members for this purpose, one member being employed to engage a strand of the thread and transfer it to the other member which latter retains the thread in loop form until it is penetrated by the needle during its next descent. One constructional form of mechanism embodying the above features is shown fragmentarily in Figures 28 to 30 and will now be described. The two members referred to are indicated by the reference numerals 25 and 26. The strand diverting and transferring member 25 is rocked from the full line position to the dotted position shown in Figure 30 after each ascent of the needle and thereby diverts one strand of the needle loop to such a position that it becomes automatically engaged by the hooked end of the other member 26. The loop retaining member 26 is pivoted upon the plate 3 and is periodically tilted by the external arm 9 to eventually release the bight of the retained loop. As the needle descends it passes between the strands of a previously formed and retained loop and as it ascends the needle thread is caught by the rotary looper and drawn out in the usual way. One strand is deflected by the member 25 and transferred to the member 26 as above mentioned, and the manipulation of the remainder of the needle loop by the rotary looper and its encircling of the retained loop are the same as already described.

If the mechanism described with reference to Figures 28 to 30 engages a strand of the needle thread at a point above the bight of the retained loop penetrated by the needle the subsequent formation of the loops is as shown at two stages diagrammatically in Figures 31 and 32. If on the other hand the mechanism engages a strand of the needle thread at a point below the bight of the retained loop the subsequent formation of the loop is as shown at two stages diagrammatically in Figures 33 and 34.

The actual forms of the completed stitches in these instances differ slightly but the more general characteristics already referred to are common to all.

In the modified form of mechanism shown in Figures 35 to 38 the motion of the hooked finger is an oscillating motion as in the machine described with reference to Figures 9 to 20 but the mechanism shown in Figures 35 to 38 mechanically operates the finger in both directions instead of relying upon a spring for the return movement. This mechanism is also one in which the main shaft rotates once to each penetration of the needle as is usual in the smaller or hand operated types of sewing machines. It may be noted that the face view illustrated in Figure 35 is taken looking in the direction of the arrows in Figure 36. The case 4 is the equivalent of the usual spool thread case and remains housed practically stationary within the usual rotary looper 6 of which only the needle thread loop engaging point is shown. The hooked finger 1 is pivoted to an upward extension of the case 4 and is formed with a toothed segment $7^a$ in mesh with a correspondingly toothed segment 27 on an upward extension $28^a$ of a lever 28 pivoted at $28^b$ to the face of the case 4. The lever is curved and so shaped that in co-operating with a short crank 29 on the adjacent end of the main shaft it is rocked to the requisite degree to oscillate the hooked finger 1. It is important to note that notwithstanding the positive actuation of the lever 28 in both directions the actuating means must allow the loops of needle thread drawn out by the rotary looper to pass unchecked over the face of the case and the attached lever. By suitably shaping the lever, the timing of its actuation by the crank combined with the shaping and disposition of the latter are such that no hindrance is offered to the needle thread loops. Three different positions of the hooked finger and its actuating mechanism and of the needle thread engaging point of the rotary looper are clearly shown in Figures 35, 37 and 38.

A further modification of the arrangements above described but not needing illustration consists in employing a machine having its looper rotating in the opposite direction, that is to say clockwise looking at the machine from the needle end in which case the other co-operating parts particularly the hooked disc and strand deflector are shifted across the vertical centre line, and shaped accordingly.

In all cases the strand of the needle loop engaged to form the small loops is the strand leading direct from the last completed stitch.

What I claim and desire to secure by Letters Patent is:—

1. In a single thread sewing machine the combination with a needle plate, a reciprocating needle and a rotary looper beneath said plate, of a notched finger intermittently turned angularly beneath the needle plate near to the path of the needle, and a strand deflecting member acting in conjunction with the looper and the finger to twist within the notched portion of said finger a portion of one strand of each needle loop during formation of the latter by the looper.

2. In a single thread sewing machine the combination with a needle plate a reciprocating needle and a rotary looper beneath said plate, of a hooked finger intermittently rotated beneath the needle plate near to the path of the needle, and an intermittently actuated strand deflecting member acting in conjunction with the looper and the finger to twist within the hooked portion of said finger a portion of one strand of each needle loop during formation of the latter by the looper.

3. In a single thread sewing machine the combination with a needle plate a reciprocating needle and a rotary looper beneath said plate, of a member within the rotary looper, a plate extending up towards the needle plate from said member, an intermittently movable finger mounted on said plate near to the path of the needle, and a strand deflecting member serving in conjunction with the looper and finger to twist around the said finger one strand of each needle loop during formation of the latter by the looper.

4. In a sewing machine, the combination with a needle plate, a reciprocating needle a rotary looper beneath the needle plate and a spool case within said looper of a plate extending up towards the needle plate from said spool case, a finger mounted movably on an axis on said plate, means for angularly moving said finger intermittently about its axis, and a strand deflecting member serving in conjunction with the looper and finger to twist around the said finger one strand of each needle loop during formation of the latter by the looper.

5. In a sewing machine the combination with a needle plate, a reciprocating needle a rotary looper beneath the needle plate and a spool case within said looper, of a plate extending up towards the needle plate from said spool case, a finger mounted movably on an axis on said plate, means for angularly moving said finger intermittently about its axis, a strand deflecting member serving in conjunction with the looper and finger to twist around the said finger one strand of each needle loop during formation of the latter by the looper and means whereby said strand deflecting member can be rendered inoperative.

6. In a sewing machine, the combination with a needle plate, a reciprocating needle a rotary looper beneath the needle plate and a spool case within said looper, of a plate extending up towards the needle plate from said spool case, a finger mounted movably on an axis on said plate, means for angularly moving said finger intermittently about its axis, a strand deflecting member serving in conjunction with the looper and finger to twist around the said finger one strand of each needle loop during formation of the latter by the looper and a lever co-operating with said strand deflecting member to render it inoperative when desired.

FREDERICK BAKER.